United States Patent
Daudin et al.

(10) Patent No.: US 9,931,617 B2
(45) Date of Patent: Apr. 3, 2018

(54) HYDROTREATMENT CATALYST COMPRISING A SUPPORT OBTAINED FROM AN ALUMINA GEL AND METHOD FOR PREPARING SAID CATALYST

(71) Applicant: IFP Energies nouvelles, Rueil-Malmaison (FR)

(72) Inventors: Antoine Daudin, Corbas (FR); Elodie Devers, Lyons (FR); Marc-Antoine Lelias, Ales (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 104 days.

(21) Appl. No.: 14/648,451

(22) PCT Filed: Nov. 26, 2013

(86) PCT No.: PCT/FR2013/052861
§ 371 (c)(1),
(2) Date: May 29, 2015

(87) PCT Pub. No.: WO2014/083273
PCT Pub. Date: Jun. 5, 2014

(65) Prior Publication Data
US 2015/0306580 A1    Oct. 29, 2015

(30) Foreign Application Priority Data
Nov. 29, 2012 (FR) ...................... 12 03236

(51) Int. Cl.
| | |
|---|---|
| *B01J 21/04* | (2006.01) |
| *B01J 27/19* | (2006.01) |
| *B01J 35/00* | (2006.01) |
| *B01J 35/10* | (2006.01) |
| *B01J 37/02* | (2006.01) |
| *B01J 37/08* | (2006.01) |
| *B01J 37/10* | (2006.01) |
| *C10G 45/08* | (2006.01) |
| *B01J 23/88* | (2006.01) |
| *B01J 23/882* | (2006.01) |
| *B01J 23/888* | (2006.01) |
| *B01J 27/185* | (2006.01) |
| *B01J 27/188* | (2006.01) |

(52) U.S. Cl.
CPC ............ *B01J 27/19* (2013.01); *B01J 21/04* (2013.01); *B01J 23/88* (2013.01); *B01J 23/882* (2013.01); *B01J 23/888* (2013.01); *B01J 27/188* (2013.01); *B01J 27/1853* (2013.01); *B01J 35/0006* (2013.01); *B01J 35/1014* (2013.01); *B01J 35/1019* (2013.01); *B01J 35/1042* (2013.01); *B01J 35/1047* (2013.01); *B01J 37/0201* (2013.01); *B01J 37/0207* (2013.01); *B01J 37/0209* (2013.01); *B01J 37/08* (2013.01); *B01J 37/10* (2013.01); *C10G 45/08* (2013.01); *B01J 35/1038* (2013.01)

(58) Field of Classification Search
None
See application file for complete search history.

(56) References Cited

U.S. PATENT DOCUMENTS

| 6,589,908 | B1 | 7/2003 | Ginestra et al. |
|---|---|---|---|
| 7,879,224 | B2 * | 2/2011 | Euzen ...................... B01J 21/02 |
| | | | 208/108 |
| 7,981,828 | B2 * | 7/2011 | Devers ................... B01J 23/882 |
| | | | 208/216 R |
| 8,394,262 | B2 | 3/2013 | Guichard et al. |
| 2002/0155045 | A1 | 10/2002 | Kumagai et al. |
| 2010/0155301 | A1 | 6/2010 | Guichard et al. |
| 2010/0243530 | A1 | 9/2010 | Marchand et al. |
| 2010/0304963 | A1 | 12/2010 | Singh et al. |

FOREIGN PATENT DOCUMENTS

| EP | 2255873 | A2 | 12/2010 |
|---|---|---|---|
| FR | 2895280 | A1 | 6/2007 |
| FR | 2917647 | A1 | 12/2008 |
| JP | 2001162168 | A | 6/2001 |
| JP | 2006061845 | A | 3/2006 |
| WO | 0209870 | A2 | 2/2002 |

OTHER PUBLICATIONS

International Search Report for PCT/FR2013/052861 dated Feb. 28, 2014.
English Abstract for JP-2001162168, Publication Date: Jun. 19, 2001.
English Abstract for JP-2006061845, Publication Date: Mar. 9, 2006.
English Abstract for FR2895280, Publication Date: Jun. 29, 2007.

* cited by examiner

*Primary Examiner* — Colin W. Slifka
(74) *Attorney, Agent, or Firm* — Millen, White, Zelano & Branigan, P.C.

(57) ABSTRACT

The present invention concerns a hydrotreatment catalyst comprising a support, at least one metal selected from group VIB and at least one metal selected from group VIII of the periodic table, the quantity of metal from group VIB, expressed as the oxides, being in the range 6% to 25% by weight with respect to the total catalyst weight, the quantity of metal from group VIII, expressed as the oxides, being in the range 0.5% to 7% by weight with respect to the total catalyst weight, the support comprising at least 90% by weight of alumina, in which said alumina is obtained from a mixed and extruded boehmite gel, and in which the specific surface area of said catalyst is in the range 60 to 250 $m^2/g$.

10 Claims, No Drawings

HYDROTREATMENT CATALYST COMPRISING A SUPPORT OBTAINED FROM AN ALUMINA GEL AND METHOD FOR PREPARING SAID CATALYST

The present invention relates to a hydrotreatment catalyst, in particular for an application in hydrodesulphurization, and to a method for the manufacture of a catalyst of this type. The invention also relates to a hydrodesulphurization process using said catalyst.

PRIOR ART

Oil refining and petrochemicals are now the subject of new constraints. All countries are in fact in the process of adopting severe specifications regarding sulphur; the aim, for example, is to reach 10 ppm (by weight) of sulphur in commercial gasolines in Europe and in Japan. The problem with reducing the sulphur contents essentially focusses on gasolines obtained by cracking, whether it be by catalytic cracking (FCC, Fluid Catalytic Cracking) or non-catalytic cracking (coking, visbreaking, steam cracking), namely the principal precursors of sulphur in gasoline pools.

One solution, which is familiar to the skilled person, for reducing the sulphur content consists of carrying out a hydrotreatment (or hydrodesulphurization) of hydrocarbon cuts (in particular catalytically cracked gasolines) in the presence of hydrogen and a heterogeneous catalyst. However, that process suffers from the major disadvantage of causing a very large drop in the octane number if the catalyst employed is not sufficiently selective. This reduction in the octane number is primarily linked to hydrogenation of the olefins present in this type of gasoline concomitantly with hydrodesulphurization.

In order to overcome this problem, i.e. to provide catalysts with an improved hydrodesulphurization (HDS) activity and a maximum selectivity for hydrodesulphurization compared with the olefin hydrogenation reaction, selective hydrodesulphurization catalysts have been developed.

In general, catalysts of this type used for this type of application are supported catalysts based on a transition metal sulphide containing an element from group VIB (Cr, Mo, W) and an element from group VIII (Fe, Ru, Os, Co, Rh, Ir, Pd, Ni, Pt). Thus, U.S. Pat. No. 5,985,136 claims that a catalyst with a surface concentration in the range $0.5 \times 10^{-4}$ to $3 \times 10^{-4}$ g $MoO_3/m^2$ can produce high selectivities (of 93% hydrodesulphurization as opposed to 33% olefin hydrogenation). Further, according to U.S. Pat. No. 4,140,626 and U.S. Pat. No. 4,774,220, it may be advantageous to add a dopant (alkali, alkaline-earth) to the conventional sulphide phase (CoMoS) with the aim of limiting olefin hydrogenation.

Another method for improving the intrinsic selectivity of the catalysts is to exploit the presence of carbonaceous deposits on the catalyst surface. Thus, U.S. Pat. No. 4,149,965 proposes the pre-treatment of a conventional naphtha hydrotreatment catalyst in order to partially deactivate it before using it for the hydrotreatment of gasolines. Similarly, patent application EP 0 745 660 A1 indicates that the pre-treatment of a catalyst in order to deposit between 3% and 10% by weight of coke improves the catalytic performance. In this case, it is stated that the C/H ratio must be no higher than 0.7.

In order to improve the selectivity, it is also possible to optimize the density of the oxide of the element from group VIB per square meter of support. Thus, patent application US 2004/0007504 recommends surface density values in the range $4 \times 10^4$ to $36 \times 10^4$ g of the oxide of the element from group VIB per $m^2$ of support.

Another method for improving the intrinsic selectivity of the catalysts is to add phosphorus. Patent application US 2005/0261124 A1 proposes adding phosphorus in proportions of 0.5% to 10% by weight of phosphorus with respect to the weight of catalyst, and U.S. Pat. No. 6,746,598 B1 proposes proportions of 0.1% to 10%. Phosphorus is also used as a dopant for the hydrodesulphurization activity of hydrocarbon feeds, as illustrated in U.S. Pat. No. 4,880,525 and U.S. Pat. No. 5,246,569.

Thus, refiners are still very interested in catalysts for the hydrodesulphurization of gasoline cuts which are even more active and have a HDS selectivity with respect to the hydrogenation of olefins which is improved and which thus, once used, can be used to produce a gasoline with a low sulphur content without substantial reduction of the octane number.

SUMMARY OF THE INVENTION

The present invention thus proposes a catalyst comprising a support, at least one metal selected from group VIB and at least one metal selected from group VIII of the periodic table, the quantity of metal from group VIB, expressed as the oxides, being in the range 6% to 25% by weight with respect to the total catalyst weight, the quantity of metal from group VIII, expressed as the oxides, being in the range 0.5% to 7% by weight with respect to the total catalyst weight, the support comprising at least 90% by weight of alumina which is obtained from a kneaded and extruded boehmite gel, and in which the specific surface area of said catalyst is in the range 60 to 250 $m^2/g$.

Surprisingly, the inventors have in effect observed that catalysts with an alumina support obtained from alumina gel (or boehmite gel) and with a specific surface area in the range 60 to 250 $m^2/g$ not only have an improved hydrodesulphurization activity, but also have an improved HDS selectivity compared with the hydrogenation of olefins.

In the context of the invention, the specific surface area is determined in accordance with the ASTM standard D3663-03 (BET method).

The catalyst of the invention comprises an alumina support with a gamma, delta or theta phase, alone or as a mixture.

In a preferred embodiment, the catalyst further comprises phosphorus and the phosphorus content is in the range 1% to 10% by weight of $P_2O_5$ with respect to the total catalyst weight.

Preferably, the metal from group VIB is selected from molybdenum and tungsten and the metal from group VIII is selected from cobalt and nickel.

The quantity of metal from group VIB is preferably in the range 7% to 20% and more preferably in the range 10% to 18% by weight of the oxide with respect to the total catalyst weight, and the quantity of metal from group VIII is in the range 0.5% to 5% by weight of the oxide with respect to the total catalyst weight.

In accordance with a highly preferred embodiment, the catalyst comprises a support obtained from alumina gel shaped by extrusion and an active metallic phase which includes cobalt, molybdenum and phosphorus. Preferably, the density of the molybdenum, expressed as the number of atoms of molybdenum per $nm^2$ of catalyst, is in the range 3 to 5, the Co/Mo atomic ratio is in the range 0.3 to 0.5 and the P/Mo atomic ratio is in the range 0.1 to 0.3.

The catalyst of the invention preferably has a total pore volume, determined using the ASTM method D4284, in the range 0.60 to 1.00 mug, and preferably in the range 0.70 to 0.90 mL/g.

The catalyst of the invention preferably has a mean pore diameter (obtained using the ASTM method D4284) of more than 8 nm, preferably in the range 10 to 50 nm.

In accordance with a first aspect of the invention, the catalyst has a specific surface area which is preferably in the range 60 to 150 m²/g when HDS catalysts with an enhanced selectivity are to be obtained. Thus, in accordance with a preferred embodiment of this first aspect of the invention, the hydrodesulphurization catalyst with improved HDS selectivity compared with the hydrogenation of olefins comprises a support obtained from alumina gel shaped by extrusion, an active metallic phase which contains cobalt, molybdenum and phosphorus and has a molybdenum density, expressed as the number of atoms of molybdenum per nm² of catalyst, in the range 3 to 5, a Co/Mo atomic ratio in the range 0.3 to 0.5, a P/Mo atomic ratio in the range 0.1 to 0.3 and a specific surface area of the catalyst in the range 60 to 150 m²/g, preferably in the range 60 to 130 m²/g and more preferably in the range 70 to 90 m²/g.

In accordance with another aspect of the invention, the catalyst has a specific surface area which is preferably in the range 150 to 200 m²/g when a catalyst with both good selectivity and HDS activity is to be obtained.

Finally, in accordance with another aspect of the invention, the catalyst has a specific surface area which is preferably in the range 200 to 250 m²/g when the HDS activity of said catalyst is to be prioritized over its selectivity.

Thus, the Applicant has developed a family of novel hydrodesulphurization catalysts the properties of which, in terms of selectivity and activity, can readily be modified, essentially by means of the specific surface area, in a manner such that the catalyst may be selected in a rational manner in particular as a function of the feed to be treated and/or industrial constraints. As an example, catalysts with a high specific surface area (for example in the range 200 to 250 m²/g) and thus with a hydrodesulphurization activity are favoured when the process is to be operated over long periods. In fact, using an active catalyst means that lower temperatures in order to obtain equivalent desulphurization ratios for the same feed can be employed. Operating at a lower temperature in fact limits deactivation of the catalyst which is generally due to the formation of coke on the catalyst which is favoured at high temperature.

In contrast, it is instead possible to use a catalyst with a low specific surface area (for example between 60 and 150 m²/g) which is thus particularly selective, when the gasoline to be treated contains little sulphur but a large quantity of olefins, in order to limit hydrogenation of the olefins as far as possible and thus to preserve the octane number.

The invention also pertains to a process for the preparation of a catalyst, which comprises the following steps:

a) bringing either an aqueous solution of acidic aluminium salts into contact with an alkaline solution, or an aqueous solution of basic aluminium salts into contact with an acidic solution containing no aluminium, or an aqueous solution of acidic aluminium salts into contact with an alkaline solution of aluminium salts, in order to form a boehmite gel;

b) kneading said gel obtained in step a) in an acidic or basic medium;

c) shaping the kneaded gel obtained from step b) in order to form a support in an extruded form;

d) heat treating the alumina support obtained from step c), so as to obtain a specific surface area for the support in the range 60 to 300 m²/g;

e) impregnating the alumina support obtained from step d) with an aqueous solution comprising at least one precursor of a metal selected from group VIB and at least one precursor of a metal selected from group VIII of the periodic table;

f) heat treating said support impregnated with metals obtained from step e) in order to obtain a specific surface area for the catalyst in the range 60 to 250 m²/g.

In accordance with a preferred embodiment, the heat treatment of step d) comprises at least one hydrothermal treatment step and at least one calcining step, the hydrothermal treatment step being carried out in the presence of water in a vessel at a temperature in the range 100° C. to 300° C. for a period in the range 0.5 to 8 hours and the calcining step being carried out after the hydrothermal treatment step in air at a temperature in the range 400° C. to 1500° C. for 1 to 8 hours.

The hydrothermal treatment of the invention may include a step for impregnation of the support with an aqueous acidic solution before bringing said impregnated support up to temperature in the vessel.

In accordance with another embodiment, the heat treatment of step d) is a calcining step carried out in air with a water content in the air in the range 0 to 50% by weight, at a temperature in the range 400° C. to 1500° C. for 1 to 8 hours.

Preferably, the shaped support is dried before the heat treatment step d).

Treatment step f) comprises at least one step for drying the support impregnated with metals at a temperature in the range 80° C. to 200° C., optionally followed by a step for calcining at a temperature of more than 400° C. In accordance with a preferred embodiment, after impregnation of the metals onto the support, the catalyst preparation process of the invention comprises a step for heat treatment which comprises a step for drying at a temperature in the range 80° C. to 200° C. followed by a step for calcining at a temperature of more than 400° C.

Finally, the present invention concerns a process for the hydrodesulphurization of a gasoline cut in which hydrogen and said gasoline cut are brought into contact with a catalyst in accordance with the invention, at a temperature in the range 200° C. to 400° C., at a total pressure in the range 1 to 3 MPa and with an hourly space velocity (HSV, defined as the volume flow rate of feed with respect to the volume of catalyst) in the range 1 to 10 hour$^{-1}$. Preferably, the hydrodesulphurization of gasolines using the catalysts of the invention, and in particular the catalyst with a high HDS selectivity compared with the hydrogenation of olefins, is carried out under the following conditions:

a temperature in the range 230° C. to 330° C.;
a total pressure in the range 1.5 to 2.5 MPa;
an hourly space velocity (HSV) in the range 2 to 6 h$^{-1}$;
a hydrogen/gasoline feed ratio by volume in the range 100 to 500 NL/L.

Before using them in a hydrodesulphurization process, the catalysts of the invention undergo a sulphurization step in order to transform the metals in the oxide form into the sulphide form. This activation step is advantageously carried out in a sulpho-reducing atmosphere which is in-situ (in the hydrodesulphurization unit) or ex-situ (outside the hydrodesulphurization unit) using any method which is known to the skilled person. As an example, in-situ sulphurization may be carried out in the presence of hydrogen and a feed composed of a sulphurizing agent which is capable of liberating sulphur in the form of hydrogen sulphide.

The hydrodesulphurization process is particularly suited to treating gasolines obtained from catalytic cracking units (FCC gasoline).

DETAILED DESCRIPTION OF THE INVENTION

Process for Obtaining an Alumina Gel (Step a) of the Catalyst Preparation Process The catalyst of the invention comprises an alumina support which is obtained from gelled alumina (or alumina gel) which essentially contains a precursor of the aluminium oxy(hydroxide) type (AIO(OH))—also known as boehmite.

In accordance with the invention, the alumina gel (also known as boehmite gel) is synthesized by precipitation of basic and/or acidic solutions of aluminium salts induced by changing the pH or any other method known to the skilled person (P. Euzen, P. Raybaud, X. Krokidis, H. Toulhoat, J. L. Le Loarer, J. P. Jolivet, C. Froidefond, Alumina, in Handbook of Porous Solids, Eds F. Schlth, K. S. W. Sing, J. Weitkamp, Wiley-VCH, Weinheim, Germany, 2002, pp. 1591-1677).

In general, the precipitation reaction is carried out at a temperature in the range 5° C. to 80° C. and at a pH in the range 6 to 10. Preferably, the temperature is in the range 35° C. to 70° C. and the pH is in the range 6 to 10.

In accordance with one embodiment, the alumina gel is obtained by bringing an aqueous solution of an acidic aluminium salt into contact with a basic solution. As an example, the acidic aluminium salt is selected from the group constituted by aluminium sulphate, aluminium nitrate or aluminium chloride; preferably, said acidic salt is aluminium sulphate. The basic solution is preferably selected from sodium hydroxide or potassium hydroxide.

Alternatively, an alkaline solution of aluminium salts which may be selected from the group constituted by sodium aluminate and potassium aluminate may be brought into contact with an acidic solution. In a highly preferred variation, the gel is obtained by bringing a sodium aluminate solution into contact with nitric acid. The sodium aluminate solution advantageously has a concentration in the range $10^{-5}$ to $10^{-1}$ mol/L; preferably, this concentration is in the range $10^{-4}$ to $10^{-2}$ mol/L.

In accordance with another embodiment, the alumina gel is obtained by bringing an aqueous solution of acidic aluminium salts into contact with an alkaline solution of alumina salts.

Kneading of Alumina Gel (Step b) of the Catalyst Preparation Process)

The alumina gel obtained after the precipitation step then undergoes a kneading step, preferably in an acidic medium. The acid employed may be nitric acid, for example.

This step is carried out using known tools such as Z arm mixers, grinder-mixers, continuous single or twin screws in order to transform the gel into a product with the consistency of a paste.

In accordance with an advantageous embodiment, one or more compounds known as "pore-forming agents" may be added to the mixing medium. These compounds have the property of degrading upon heating and thus of creating porosity in the support. As an example, it is possible to use wood flour, wood charcoal, tars, or plastic materials as pore-forming agents.

Shaping of Paste (Step c) of the Catalyst Preparation Process)

The paste thus obtained after kneading is passed through an extrusion die. In general, the extrudates have a diameter in the range 0.4 to 100 mm, preferably in the range 0.5 to 100 mm, and more preferably in the range 0.5 to 10 mm, and still more preferably in the range 0.4 to 4 mm. These extrudates may be cylindrical, or multilobed, (for example trilobed or quadrilobed).

After shaping, the support is optionally dried before undergoing the heat treatment of step d) of the process. As an example, drying is carried out at a temperature in the range 100° C. to 200° C.

Heat Treatment of Alumina Support (Step d) of the Catalyst Preparation Process)

The extruded support then undergoes a heat treatment step which can be used to provide it with the physical properties which are suitable for the envisaged application.

Thus, in accordance with the invention, the heat treatment can be used to obtain a specific surface area for the support, measured using the ASTM standard D3663-03, which is generally in the range 60 to 300 m$^2$/g.

In accordance with a first embodiment, the heat treatment comprises at least one step for hydrothermal treatment and at least one calcining step which is carried out after the hydrothermal treatment step.

The term "hydrothermal treatment" is used to denote a treatment by passage through an autoclave in the presence of water at a temperature above ambient temperature.

During this hydrothermal treatment, the shaped alumina may be treated in various manners. Thus, the alumina may be impregnated with an acidic solution, prior to passing it through the autoclave, the hydrothermal treatment of the alumina being carried out either in the vapour phase or in the liquid phase; this vapour or liquid phase of the autoclave may or may not be acidic. This impregnation, before the hydrothermal treatment, may be carried out dry or by immersing the alumina in an acidic aqueous solution. The term "dry impregnation" is intended to mean bringing the alumina into contact with a volume of solution which is less than or equal to the total pore volume of the treated alumina. Preferably, the impregnation is carried out dry.

It is also possible to treat the extruded support without prior impregnation with an acidic solution, the acidity in this case being provided by the aqueous liquid of the autoclave.

The aqueous acidic solution comprises at least one acidic compound which can dissolve at least a portion of the alumina of the extrudates. The term "acidic compound which can dissolve at least a portion of the alumina of the extrudates" means any acidic compound which, when brought into contact with the alumina extrudates, dissolves at least a portion of the 1.5 aluminium ions. Preferably, the acid should dissolve at least 0.5% by weight of the alumina in the alumina extrudates.

Preferably, this acid is selected from strong acids such as nitric acid, hydrochloric acid, perchloric acid or sulphuric acid, or a weak acid such as acetic acid, or a mixture of these acids, used in a concentration such that its aqueous solution has a pH of less than 4.

In accordance with a preferred embodiment, the hydrothermal treatment is carried out in the presence of nitric acid and acetic acid, used alone or as a mixture. The autoclave is preferably a rotating basket autoclave such as that defined in patent application EP-A-0 387 109.

The hydrothermal treatment may also be carried out under saturated vapour pressure or under a partial pressure of steam at least equal to 70% of the saturated vapour pressure corresponding to the treatment temperature.

Preferably, the hydrothermal treatment is carried out at a temperature in the range 100° C. to 300° C., for 0.5 to 8 hours.

The calcining step which takes place after the autoclaving of this first embodiment is carried out at a temperature which is generally in the range 400° C. to 1500° C., preferably in the range 800° C. to 1300° C., for 1 to 8 hours in air, with a water content which is generally in the range 0 to 50% by weight.

By way of example, in order to illustrate this first embodiment of the heat treatment step d), the dried support obtained from step c) undergoes, in succession, a first calcining step followed by a hydrothermal treatment step and finally by a second calcining step.

In accordance with an alternative second embodiment of step d), after shaping, the support only undergoes a calcining heat treatment, i.e. there is no hydrothermal treatment before or after this calcining. This is carried out at a temperature which is generally in the range 400° C. to 1500° C., preferably in the range 500° C. to 1200° C., for 1 to 8 hours in air with a water content which is generally in the range 0 to 50% by weight. In this embodiment, it is also possible to carry out several calcining steps in increasing temperature stages until the desired final calcining temperature is reached.

Finally, at the end of the heat treatment of step d), the specific surface area of the support is generally in the range 60 to 300 m$^2$/g. The support has a delta, gamma or theta alumina type crystallographic structure, alone or as a mixture. The existence of different crystallographic structures is primarily linked to the conditions for carrying out the heat treatment of step d) and in particular the final calcining temperature.

Deposition of Metals on the Support (Step e) of the Process)

This step consists of depositing at least one metal from group VIII and at least one metal from group VIB, for example by impregnation of the elements onto the selected support. This impregnation may, for example, be carried out using the mode known to the skilled person as dry impregnation, in which the desired quantity of elements is introduced in the form of salts which are soluble in the selected solvent, for example demineralized water, in order to fill the pores of the support as exactly as possible. The support which is thus filled with solution is preferably allowed to mature at ambient temperature in a closed water-saturated vessel so as to allow homogeneous diffusion of the impregnation solution contained in the pores of the support.

The metal from group VIII (groups 8, 9 or 10 of the new notation for the periodic classification of the elements: Handbook of Chemistry and Physics, 76$^{th}$ edition, 1995-1996) is preferably selected from cobalt and nickel.

The metal from group VIB (group 6 of the new notation for the periodic classification of the elements: Handbook of Chemistry and Physics, 76$^{th}$ edition, 1995-1996) is preferably selected from molybdenum and tungsten.

As an example, salts of metals from groups VIB and VIII which may be used for deposition are cobalt nitrate, nickel nitrate, ammonium heptamolybdate, or ammonium metatungstate. However, any other precursor with sufficient solubility may also be used. It is also possible to cite metal hydroxides, carbonates, acetates and carboxylates.

In accordance with a preferred embodiment, the catalyst further comprises phosphorus. The element phosphorus may, for example, be provided in the form of phosphoric acid, for example added to the impregnation solution containing the metals from groups VIII and VIB, but also added upon synthesis of the support (for example by co-mixing).

In order to facilitate dissolving the metal precursors in the impregnation solution, one or more organic acids such as, for example, acetic acid, citric acid, oxalic acid, ethylene-diamine-tetracetic acid (or EDTA), or trinitroacetic acid (or NTA) may be added to said solution.

Heat Treatment of Catalyst Comprising the Metals of the Process (Step f)

This step consists of drying the catalyst after impregnation step e) in order to eliminate residual water present in the pores of the support. Drying is carried out between 80° C. and 200° C.

A final optional calcining step at a temperature of more than 400° C. may be applied after the drying step. This final step may in particular be used to eliminate nitrogen-containing species present during use of cobalt nitrate and/or ammonium heptamolybdate type precursors in the form of oxides of nitrogen.

Finally, the preparation process can be used to obtain catalysts with a specific surface area in the range 60 to 250 m$^2$/g and comprising the following quantities of metals:

6% to 25% by weight with respect to the total catalyst weight of the oxide of the metal from group VIB;
  0.5% to 7% by weight with respect to the total catalyst weight of the oxide of the metal from group VIII;
  1% to 10% by weight of P$_2$O$_5$ with respect to the total catalyst weight.

EXAMPLES

Example 1 (Comparative): Preparation of Aluminas S1, S2 and S3 by Rapid Decomposition of Hydrargillite (Known as Flash Aluminas), Conditions for Shaping and Heat Treatment The first step consisted of a rapid dehydration of gibbsite at high temperature (800° C.) and with a short contact time (0.8 second) in order to obtain a Khi transition alumina powder. Washing with water was carried out to reduce the Na$_2$O content (3 kg/kg of Al$_2$O$_3$), followed by a second rapid dehydration treatment similar to the preceding treatment, in order to obtain an alumina powder. This powder was then shaped into beads in a bowl granulator. The beads obtained thereby were dried at 150° C. then calcined at 500° C. in order to obtain the support S1.

The supports S2 and S3 were obtained from the preceding support after drying and to which a hydrothermal treatment had been applied at a high partial pressure of water (100%) for 8 hours, followed by calcining respectively at 650° C. and 850° C.

The specific surface area of the supports S1, S2 and S3 was determined in nitrogen in accordance with the ASTM standard D3663-03. The total pore volume was determined by mercury porosimetry in accordance with the ASTM standard D4284-03 (with a wetting angle of 140°).

TABLE 1

Characteristics of supports S1, S2 and S3.

| | Supports | | |
|---|---|---|---|
| | S1 | S2 | S3 |
| S$_{BET}$ (m$^2$/g) | 256 | 134 | 69 |
| Total pore volume (cc/g) | 0.50 | 1.04 | 0.61 |

Example 2 (in Accordance with the Invention): Preparation of Aluminas S4 to S8 by Precipitation (Termed Alumina Gels), Shaping and Heat Treatment Conditions The alumina gel was synthesized via a mixture of sodium aluminate and aluminium sulphate. The precipitation reaction was carried out at a temperature of 60° C., at a pH of 9, for 60 min and with stirring at 200 rpm. The gel obtained thereby underwent kneading on a Z arm mixer in order to provide the paste. Extrusion was carried out by passing the paste through a die provided with a 1.6 mm diameter orifice in the form of a three-lobed shape. The extrudates obtained thereby were dried at 150° C. then calcined at 450° C. in dry air. This support was denoted S4.

Starting from the support S4, we prepared supports S5, S6, S7 and S8.

Support S5 was obtained after hydrothermal treatment of support S4 at 650° C. in the presence of an aqueous 6.5% by weight acetic acid solution for 3 hours in an autoclave, then calcined in dry air at 1000° C. for 2 hours in a tube reactor.

Support S6 was obtained after a hydrothermal treatment of support S4 under identical conditions to those for support S5, followed by calcining in dry air at 850° C. for 2 hours in a tube reactor.

Support S7 was obtained by calcining support S4 in dry air at 1050° C. for 2 hours in a tube reactor.

Support S8 was obtained after calcining in moist air (50% of water/kg of dry air) of support S4 at 850° C. for 2 hours in a tube reactor.

The specific surface area of the supports was determined in nitrogen in accordance with ASTM standard D3663. The total pore volume of the supports was determined by mercury porosimetry in accordance with ASTM standard D4284 (with a wetting angle of 140°).

TABLE 2

Characteristics of aluminas S4 to S8

| | Support | | | | |
|---|---|---|---|---|---|
| | S4 | S5 | S6 | S7 | S8 |
| $S_{BET}$ (m$^2$/g) | 291 | 79 | 90 | 95 | 140 |
| Total pore volume (cc/g) | 0.75 | 0.84 | 0.80 | 0.60 | 0.73 |

Example 3 (Comparative): Synthesis of CoMoP/Flash Alumina Catalysts A1, A2 and A3

Catalysts A1, A2 and A3 were obtained by dry impregnation of an aqueous solution prepared from molybdenum oxide, cobalt hydroxide and phosphoric acid, the volume of said solution containing cobalt, molybdenum and phosphorus precursors being rigorously equal to the pore volume of the alumina support mass. The concentrations of precursors in the aqueous solution were adjusted so as to obtain:

a surface density of molybdenum fixed at approximately 4 atoms of molybdenum per nm$^2$ of catalyst, Co/Mo and P/Mo atomic ratios equal to 0.3 and 0.15 respectively.

After a maturation step for 12 hours, the solid was dried for 12 hours at 120° C. The solid was then calcined in air at 450° C. for 2 hours.

TABLE 3

Characteristics of catalysts A1, A2 and A3.

| | Catalyst | | |
|---|---|---|---|
| | A1 | A2 | A3 |
| Support | S1 | S2 | S3 |
| $S_{BET}$ (m$^2$/g-catalyst) | 186 | 114 | 62 |
| CoO (% by wt) | 2.8 | 2.3 | 0.95 |
| MoO$_3$ (% by wt) | 18 | 11.3 | 6 |
| P$_2$O$_5$ (% by wt) | 1.3 | 0.9 | 0.45 |

Example 4: Synthesis of CoMoP/Alumina Gel Catalysts (in Accordance with the Invention)

Catalysts A4, A5, A6, A7 and A8 were obtained by dry impregnation of an aqueous solution prepared from molybdenum oxide, cobalt hydroxide and phosphoric acid, the volume of said solution containing cobalt, molybdenum and phosphorus precursors being rigorously equal to the pore volume of the alumina support mass. The concentrations of precursors in the aqueous solution were adjusted so as to obtain:

a surface density of molybdenum fixed at approximately 4 atoms of molybdenum per nm$^2$ of catalyst, Co/Mo and P/Mo atomic ratios equal to 0.3 and 0.15 respectively.

After a maturation step for 12 hours, the solid was dried for 12 hours at 120° C. The solid was then calcined in air at 450° C. for 2 hours.

TABLE 4

Characteristics of catalysts A4, A5, A6 and A7.

| | Catalyst | | | | |
|---|---|---|---|---|---|
| | A4 | A5 | A6 | A7 | A8 |
| Support | S4 | S5 | S6 | S7 | S8 |
| $S_{BET}$ (m$^2$/g - catalyst) | 207 | 72 | 81 | 85 | 118 |
| CoO (% by wt) | 3.2 | 1.1 | 1.2 | 1.3 | 1.85 |
| MoO$_3$ (% by wt) | 20 | 7 | 7.8 | 8.2 | 11.5 |
| P$_2$O$_5$ (% by wt) | 1.5 | 0.52 | 0.58 | 0.6 | 0.85 |

Example 5: Evaluation of Catalysts A1, A2, A3, A4, A5, A6, A7 and A8

A model feed representative of a catalytically cracked gasoline (FCC) containing 10% by weight of 2,3-dimethyl-but-2-ene and 0.33% by weight of 3-methylthiophene (i.e. 1000 ppm by weight of sulphur in the feed) was used to assess the catalytic performances of the various catalysts. The solvent used was heptane.

The hydrodesulphurization reaction (HDS) was operated in a fixed traversed bed reactor at a total pressure of 1.5 MPa, at 210° C., with HSV=6 h$^{-1}$ (HSV=volume flow rate of feed/volume of catalyst) in the presence of 4 mL of catalyst. Prior to the HDS reaction, the catalyst was sulphurized in situ at 450° C. for 2 hours in a stream of 1-1H$_2$ containing 1.5 mol % of H$_2$S at atmospheric pressure.

Each of the catalysts was placed in said reactor in succession. Samples were taken at various time intervals and were analysed by gas phase chromatography in order to observe the disappearance of the reagents and the formation of the products.

The catalytic performances of the catalysts were evaluated from the catalytic activity and the selectivity. The HDS activity was expressed using the rate constant for the HDS reaction of 3-methylthiophene (kHDS), normalized by the volume of catalyst introduced, assuming $1^{st}$ order kinetics with respect to the sulphur-containing compound. The activity HydO was expressed using the rate constant for the olefin hydrogenation reaction (HydO), namely in the present case for the hydrogenation reaction of 2,3-dimethylbut-2-ene, normalized by the volume of catalyst introduced, assuming $1^{st}$ order kinetics with respect to the olefin.

The catalyst selectivity was expressed as the normalized ratio of the rate constants; kHDS/kHydO. The ratio kHDS/kHydO will be higher when the catalyst is more selective, signifying limited hydrogenation of the 2,3-dimethylbut-2-ene.

The HDS activity and the selectivity of the supported catalysts are given in Tables 5 and 6. The values were normalized using catalyst A1 as the reference, i.e. the HDS activity and the selectivity of catalysts A2 to A8 were compared with respect to those of catalyst A1 for which the HDS activity and selectivity were fixed at 100.

TABLE 5

Relative selectivity of catalysts A1, A2 and A3.

|  | Catalysts | | |
| --- | --- | --- | --- |
|  | A1 | A2 | A3 |
| $S_{BET}$ (m$^2$/g of catalyst) | 186 | 114 | 62 |
| Relative HDS activity | 100 | 78 | 63 |
| Relative selectivity | 100 | 127 | 139 |

TABLE 6

Relative selectivity of catalysts A4, A5, A6, A7 and A8.

|  | Catalysts | | | | |
| --- | --- | --- | --- | --- | --- |
|  | A4 | A5 | A6 | A7 | A8 |
| $S_{BET}$ (m$^2$/g of catalyst) | 207 | 72 | 81 | 85 | 118 |
| Relative HDS activity | 148 | 83 | 86 | 88 | 97 |
| Relative selectivity | 124 | 190 | 172 | 161 | 150 |

For catalysts A4 to A8 (in accordance with the invention), we observe that the catalyst with a high specific surface area (A4) has a slightly lower selectivity compared with the low and medium specific surface area catalysts (A5 to A8). In contrast, catalyst A4 has a higher hydrodesulphurization activity compared with its low and medium specific surface area homologues.

It will also be noted that catalyst A4 with a high specific surface area (in accordance with the invention) is better in terms of selectivity and 1-IDS activity compared with catalyst A1 with a practically equivalent specific surface area but with a flash alumina support.

Comparing the low specific surface area catalysts (A5, A6, A7, A5) of the invention with the prior art catalysts A2 and A3 (flash alumina support), it will be observed that their selectivity and activity are improved.

The invention claimed is:

1. A catalyst comprising:
   a support,
   at least one metal selected from group VIB, which is molybdenum,
   phosphorus, and
   at least one metal selected from group VIII of the periodic table, which is cobalt,
   wherein the quantity of metal from group VIB, expressed as the oxides, is in the range 6% to 25% by weight with respect to the total catalyst weight, and the quantity of metal from group VIII, expressed as the oxides, is in the range 0.5% to 7% by weight with respect to the total catalyst weight,
   wherein the density of molybdenum, expressed as the number of atoms of molybdenum per nm$^2$ of catalyst, is in the range 3 to 5,
   wherein the Co/Mo atomic ratio is in the range 0.3 to 0.5,
   wherein the P/Mo atomic ratio is in the range 0.1 to 0.3,
   wherein the support comprising at least 90% by weight of alumina, in which said alumina is obtained from a kneaded and extruded boehmite gel, and
   wherein the specific surface area of said catalyst is in the range 60 to 150 m$^2$/g.

2. The catalyst according to claim 1, in which the quantity of metal from group VIB, expressed as the oxides, is in the range 7% to 20% by weight with respect to the total weight of said catalyst and the quantity of metal from group VIII, expressed as the oxides, is in the range 0.5% to 5% by weight with respect to the total catalyst weight.

3. The catalyst according to claim 1, in which the alumina support comprises a gamma, delta or theta alumina, alone or as a mixture.

4. A process for preparing a catalyst according to claim 1, comprising the following steps:
   a) bringing either an aqueous solution of acidic aluminium salts into contact with an alkaline solution, or an aqueous solution of basic aluminium salts into contact with an acidic solution containing no aluminium, or an aqueous solution of acidic aluminium salts into contact with an alkaline solution of aluminium salts, in order to form a boehmite gel;
   b) kneading said gel obtained in step a) in a manner so as to produce a paste;
   c) shaping the paste obtained from step b) in order to form a support in an extruded form;
   d) heat treating the alumina support obtained from step c), so as to obtain a specific surface area for the support in the range 60 to 300 m$^2$/g;
   e) impregnating the alumina support obtained from step d) with a solution comprising at least one precursor of the metal selected from group VIB and at least one precursor of the metal selected from group VIII of the periodic table;
   f) heat treating said support impregnated with metals obtained from step e) in order to obtain a specific surface area for the catalyst in the range 60 to 150 m$^2$/g.

5. The preparation process according to claim 4, in which the heat treatment of step d) comprises at least one hydrothermal treatment step and at least one calcining step, the calcining step being carried out after the hydrothermal treatment and in which the hydrothermal treatment step is carried out in the presence of water in a vessel at a temperature in the range 100° C. to 300° C. for a period in the range 0.5 to 8 hours and the calcining step is carried out in air at a temperature in the range 400° C. to 1500° C. for 1 to 8 hours.

6. The process according to claim 5, in which the hydrothermal treatment comprises a step for impregnation of the support with an aqueous acidic solution before bringing said impregnated support up to temperature in the vessel.

7. The preparation process according to claim 4, in which the heat treatment of step d) is a calcining step alone, carried out in air with a water content in the air in the range 0 to 50% by weight, at a temperature in the range 400° C. to 1500° C. for 1 to 8 hours.

8. The preparation process according to claim 4, in which the support obtained in step c) is dried before the heat treatment step d).

9. The preparation process according to claim 4, in which the heat treatment of step f) comprises at least one step for drying the support impregnated with metals at a temperature in the range 80° C. to 200° C., optionally followed by a step for calcining at a temperature of more than 400° C.

10. A process for the hydrodesulphurization of a gasoline cut, in which hydrogen and said gasoline cut are brought into contact with a catalyst in accordance with claim 1, at a temperature in the range 200° C. to 400° C., at a total pressure in the range 1 to 3 MPa and with an hourly space velocity (HSV) in the range 1 to 10 hour$^{-1}$.

* * * * *